United States Patent
Murakami (12) United States Patent (10) Patent No.: US 12,358,494 B2
(45) Date of Patent: Jul. 15, 2025

(54) CONTROLLER FOR HYBRID ELECTRIC VEHICLE AND METHOD FOR CONTROLLING HYBRID ELECTRIC VEHICLE

(71) Applicant: TOYOTA JIDOSHA KABUSHIKI KAISHA, Aichi-ken (JP)

(72) Inventor: Koji Murakami, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 271 days.

(21) Appl. No.: 18/171,677

(22) Filed: Feb. 21, 2023

(65) Prior Publication Data

US 2023/0271603 A1     Aug. 31, 2023

(30) Foreign Application Priority Data

Feb. 25, 2022  (JP) ................. 2022-028212

(51) Int. Cl.
*B60W 20/40* (2016.01)
*B60W 10/06* (2006.01)
*B60W 10/08* (2006.01)

(52) U.S. Cl.
CPC ............ *B60W 20/40* (2013.01); *B60W 10/06* (2013.01); *B60W 10/08* (2013.01); *B60W 2510/0638* (2013.01); *B60W 2510/242* (2013.01)

(58) Field of Classification Search
CPC ....... B60W 10/08; B60W 20/50; F02N 11/04; F02N 11/0848; F02N 2300/2002; F02N 11/006

See application file for complete search history.

(56) References Cited

U.S. PATENT DOCUMENTS

| | | | |
|---|---|---|---|
| 9,543,870 B1* | 1/2017 | Gauthier | B60L 58/24 |
| 2015/0001857 A1 | 1/2015 | Sekiguchi | |
| 2016/0325725 A1* | 11/2016 | Yang | B60K 6/442 |
| 2017/0282904 A1* | 10/2017 | Morita | B60K 6/387 |
| 2022/0306075 A1* | 9/2022 | Fukao | B60K 6/547 |

(Continued)

FOREIGN PATENT DOCUMENTS

| | | | | |
|---|---|---|---|---|
| EP | 148924 A * | 7/1985 | | C25C 7/04 |
| EP | 1489294 A2 | 12/2004 | | |
| JP | 2005-009439 A | 1/2005 | | |

(Continued)

*Primary Examiner* — Jelani A Smith
*Assistant Examiner* — Toya Pettiegrew
(74) *Attorney, Agent, or Firm* — HAUPTMAN HAM, LLP (57) ABSTRACT

A controller for a hybrid electric vehicle executes an engine starting process including a first starting process and a second starting process. The first starting process drives a motor generator. The second starting process is executed when a shifting condition is satisfied in the first starting process. The second starting process includes suspending the supply of power to the motor generator and then driving the motor generator. When an engine rotation speed becomes greater than or equal to an engine rotation speed threshold value and an elapsed time is within a second time threshold value during the second starting process, the controller determines that an engine is successfully started. The second time threshold value is greater than a first time threshold value that is compared with the elapsed time during the first starting process.

9 Claims, 6 Drawing Sheets

(56) References Cited

U.S. PATENT DOCUMENTS

2023/0392543 A1\* 12/2023 Colavincenzo ........... B60L 1/02

FOREIGN PATENT DOCUMENTS

| JP | 2005-282600 A | 10/2005 |
|----|---------------|---------|
| JP | 2010-216363 A | 9/2010 |
| JP | 2013082404 A | 5/2013 |
| JP | 2015009743 A | 1/2015 |

\* cited by examiner

| Crank Angle | 0-180 degree | 180-360 degree | 360-540 degree | 540-720 degree |
|---|---|---|---|---|
| Cylinder #1 | Expansion | Exhaustion | Intake | Compression |
| Cylinder #2 | Exhaustion | Intake | Compression | Expansion |
| Cylinder #3 | Compression | Expansion | Exhaustion | Intake |
| Cylinder #4 | Intake | Compression | Expansion | Exhaustion |

CONTROLLER FOR HYBRID ELECTRIC VEHICLE AND METHOD FOR CONTROLLING HYBRID ELECTRIC VEHICLE

RELATED APPLICATIONS

The present application claims priority of Japanese Patent Application No. 2022-028212 filed Feb. 25, 2022, the disclosure of which is hereby incorporated by reference herein in its entirety.

BACKGROUND

1. Field

The following description relates to a controller for a hybrid electric vehicle and a method for controlling a hybrid electric vehicle.

2. Description of Related Art

Japanese Laid-Open Patent Publication No. 2015-009743 describes a controller that executes a starting process for starting an engine. When a specified period of time elapses from the beginning of the starting process, if the rotation speed of the engine is less than or equal to a predetermined rotation speed, the controller determines that the engine was not started successfully.

Japanese Laid-Open Patent Publication No. 2013-082404 describes a controller configured to control a vehicle including a motor generator, a starter, and an engine. When the controller determines that the motor generator failed to start the engine, the controller starts the engine with the starter.

The starter starts the engine in the following manner. First, a pinion gear of the starter meshes with a drive plate attached to a crankshaft. Then, the starter is driven by power from a battery. This rotates the crankshaft and then starts the engine. When starting the engine with the starter, a large force is applied to the drive plate. Thus, a loud noise is produced when starting the engine with the starter.

The motor generator may be connected to the engine by, for example, a belt. With such a structure, the motor generator starts the engine more quietly than the starter. This is because the belt allows the engine to be driven more quietly than gears.

Such a hybrid electric vehicle that connects the engine and the motor generator with a belt may include a configuration for determining whether the motor generator failed to start the engine based on whether a specified period of time has elapsed. The specified period of time is set to avoid a situation in which the supply of high voltage power used for cranking to the motor generator over a long period of time damages the battery. Further, the above-described hybrid electric vehicle may include a starter for starting the engine when the motor generator fails to start the engine. From the aspect of quietness, as described above, it is desirable that the motor generator starts the engine more often.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a hybrid electric vehicle is provided. The hybrid electric vehicle includes an engine, a motor generator, a belt connecting the engine and the motor generator, a battery configured to supply the motor generator with power, and a starter configured to start the engine. The controller includes processing circuitry configured to execute an engine starting process when an execution condition for starting the engine is satisfied. The engine starting process includes a first starting process and a second engine starting process. The first starting process drives the motor generator by supplying the motor generator with power from the battery to crank the engine. The second starting process is executed when a shifting condition is satisfied. The shifting condition is a logical disjunction condition in which an engine rotation speed, which is a rotation speed of the engine, becomes less than zero in the first starting process or the engine rotation speed is maintained at zero for a predetermined period or longer in the first starting process. The second starting process includes suspending the supply of power from the battery to the motor generator and then driving the motor generator by supplying the motor generator with power from the battery to crank the engine. If an elapsed time from when the first starting process is initiated becomes greater than a first threshold value and the engine rotation speed remains less than an engine rotation speed threshold value during the first starting process, the processing circuitry is configured to determine that the motor generator failed to start the engine. If the elapsed time becomes greater than a second threshold value and the engine rotation speed remains less than the engine rotation speed threshold value during the second starting process, the processing circuitry is configured to determine that the motor generator failed to start the engine. The second threshold value is greater than the first threshold value. When the motor generator failed to start the engine, the processing circuitry is configured to start the engine with the starter.

In another general aspect, a controller for a hybrid electric vehicle is provided. The hybrid electric vehicle includes an engine, a motor generator, a belt connecting the engine and the motor generator, a battery configured to supply the motor generator with power, and a starter configured to start the engine. The controller includes processing circuitry configured to execute an engine starting process when an execution condition for starting the engine is satisfied. The engine starting process includes a first starting process and a second starting process. The first starting process drives the motor generator by supplying the motor generator with power from the battery to crank the engine. The second starting process is executed under a condition in which an engine rotation speed, which is a rotation speed of the engine, becomes less than zero in the first starting process. The second starting process includes suspending the supply of power from the battery to the motor generator and then driving the motor generator by supplying the motor generator with power from the battery to crank the engine. If an elapsed time from when the first starting process is initiated becomes greater than a first threshold value and the engine rotation speed remains less than an engine rotation speed threshold value during the first starting process, the processing circuitry is configured to determine that the motor generator failed to start the engine. If the elapsed time becomes greater than a second threshold value and the engine rotation speed remains less than the engine rotation speed threshold value during the second starting process, the processing circuitry is configured to determine that the motor generator failed to start the engine. The second threshold value is greater than the first threshold value. When the motor generator failed to start the engine, the processing circuitry is configured to start the engine with the starter.

In a further general aspect, a method for controlling a hybrid electric vehicle is provided. The hybrid electric vehicle includes an engine, a motor generator, a belt connecting the engine and the motor generator, a battery configured to supply the motor generator with power, and a starter configured to start the engine. When an execution condition for starting the engine is satisfied, the method includes executing an engine starting process. The engine starting process includes a first starting process and a second starting process. The first starting process drives the motor generator by supplying the motor generator with power from the battery to crank the engine. The second starting process is executed when an engine rotation speed, which is a rotation speed of the engine, becomes less than zero in the first starting process or when the engine rotation speed is maintained at zero for a predetermined period or longer in the first starting process. The second starting process includes suspending the supply of power from the battery to the motor generator and then driving the motor generator by supplying the motor generator with power from the battery to crank the engine. If an elapsed time from when the first starting process is initiated becomes greater than a first threshold value and the engine rotation speed remains less than an engine rotation speed threshold value, the method further includes determining that the motor generator failed to start the engine during the first starting process. If the elapsed time becomes greater than a second threshold value and the engine rotation speed remains less than the engine rotation speed threshold value, the method further includes determining that the motor generator failed to start the engine during the second starting process. The second threshold value is greater than the first threshold value. When the motor generator failed to start the engine, the method further includes starting the engine with the starter.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller 34 for a hybrid electric vehicle in accordance with an embodiment will now be described with reference to the drawings.

Structure of Hybrid Electric Vehicle 100

Figure 1:
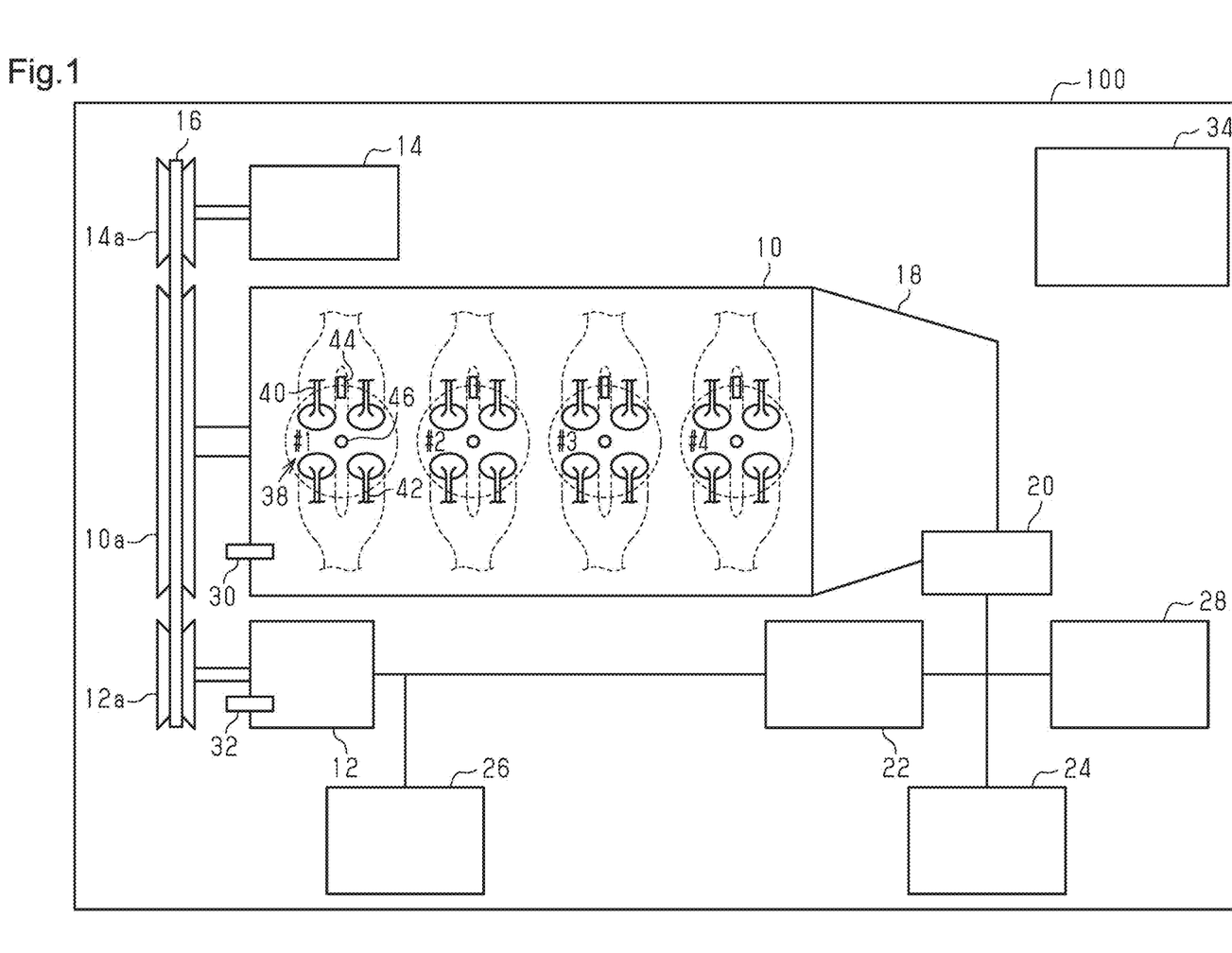
FIG. 1 is a schematic diagram showing a controller and a hybrid electric vehicle controlled by the controller in accordance with an embodiment.

FIG. 1 shows a hybrid electric vehicle (hereafter, vehicle) 100 that is controlled by the controller 34 in accordance with an embodiment. The controller 34 is mounted on the vehicle 100. The vehicle 100 includes an internal combustion engine (hereafter, engine) 10 and a motor generator 12. The vehicle 100 is provided with an air-conditioning compressor (hereafter, AC compressor) 14. The engine 10 includes a crank pulley 10a. The motor generator 12 includes a motor generator pulley 12a. The AC compressor 14 includes an AC compressor pulley 14a. A belt 16 connects the crank pulley 10a, the motor generator pulley 12a, and the AC compressor pulley 14a.

In this manner, the engine 10 and the motor generator 12 are connected to each other by the belt 16 in the vehicle 100. The controller 34 controls such a vehicle 100.

The vehicle 100 further includes a transmission 18, a starter 20, a DC-DC converter 22, an auxiliary device 24, a high-voltage battery 26, and a low-voltage battery 28. The high-voltage battery 26 is, for example, a lithium-ion battery. The low-voltage battery 28 is, for example, a lead-acid battery. The transmission 18 is connected to the engine 10. The starter 20 is connected to the transmission 18. The starter 20 is configured to drive the transmission 18. The starter 20 drives the transmission 18 to start the engine 10. The high-voltage battery 26 is connected to the motor generator 12 and the DC-DC converter 22. The motor generator 12 receives power from the high-voltage battery 26 to start the engine 10. The low-voltage battery 28 is connected to the starter 20, the DC-DC converter 22, and the auxiliary device 24.

The engine 10 includes four cylinders #1, #2, #3, and #4. In each of the cylinders #1 to #4, air is drawn into a combustion chamber 38 when an intake valve 40 opens. Fuel is injected from a fuel injection valve 44 into the combustion chamber 38. In the combustion chamber 38, an ignition device 46 produces a spark discharge to burn the air-fuel mixture.

Energy generated by the combustion is extracted as rotational energy for a crankshaft of the engine 10. The crankshaft of the engine 10 is connected to the transmission 18.

The combusted air-fuel mixture is discharged from the combustion chamber 38 when an exhaust valve 42 opens.

The controller 34 includes a microcomputer provided with a central processing unit (CPU), a read-only memory (ROM), a random-access memory (RAM), an input-output interface, and the like. The controller 34 uses the transitory storage functionality of the RAM to execute signal processing in accordance with programs stored in advance in the ROM. The controller 34 is configured to control the engine 10, the motor generator 12, and the like.

The engine 10 is provided with an engine rotation speed sensor 30. The controller 34 obtains an engine rotation speed, which is the rotation speed of the engine 10, from the engine rotation speed sensor 30. The motor generator 12 is provided with a motor generator rotation speed sensor 32. The controller 34 obtains a rotation speed of the motor generator 12 from the motor generator rotation speed sensor 32.

Motor Generator 12 Successfully Starting Engine 10

An example in which the motor generator 12 starts the engine 10 when the engine rotation speed is zero will now be described.

Figure 2:
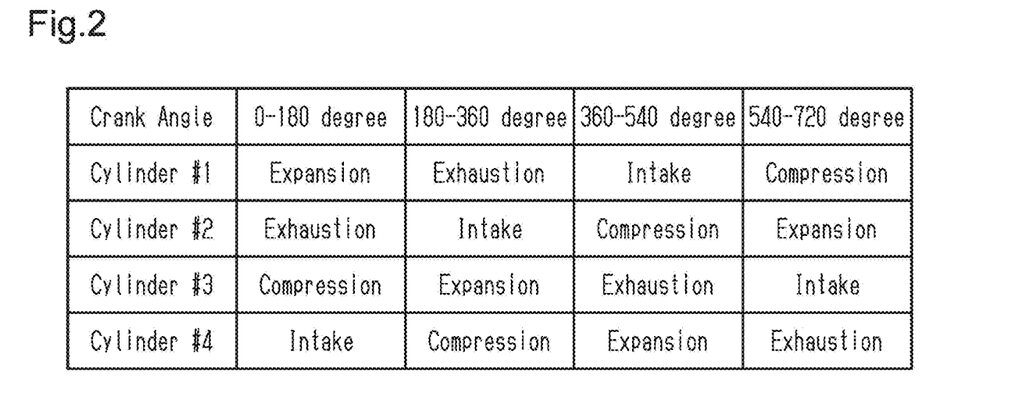
FIG. 2 is a diagram illustrating combustion cycles.

As shown in FIG. 2, when the crank angle is 0 to 180 degrees, cylinder #1 will be undergoing the expansion stroke. When the crank angle is 180 to 360 degrees, cylinder #1 will be undergoing the exhaust stroke. When the crank angle is 360 to 540 degrees, cylinder #1 will be undergoing the intake stroke. When the crank angle is 540 to 720 degrees, cylinder #1 will be undergoing the compression stroke.

As shown in FIG. 2, when the crank angle is 0 to 180 degrees, cylinder #2 will be undergoing the exhaust stroke. When the crank angle is 180 to 360 degrees, cylinder #2 will be undergoing the intake stroke. When the crank angle is 360 to 540 degrees, cylinder #2 will be undergoing the compression stroke. When the crank angle is 540 to 720 degrees, cylinder #2 will be undergoing the expansion stroke.

As shown in FIG. 2, when the crank angle is 0 to 180 degrees, cylinder #3 will be undergoing the compression stroke. When the crank angle is 180 to 360 degrees, cylinder #3 will be undergoing the expansion stroke. When the crank angle is 360 to 540 degrees, cylinder #3 will be undergoing the exhaust stroke. When the crank angle is 540 to 720 degrees, cylinder #3 will be undergoing the intake stroke.

As shown in FIG. 2, when the crank angle is 0 to 180 degrees, cylinder #4 will be undergoing the intake stroke. When the crank angle is 180 to 360 degrees, cylinder #4 will be undergoing the compression stroke. When the crank angle is 360 to 540 degrees, cylinder #4 will be undergoing the expansion stroke. When the crank angle is 540 to 720 degrees, cylinder #4 will be undergoing the exhaust stroke.

In this manner, regardless of the crank angle, one of the four cylinders #1 to #4 will be undergoing the compression stroke and another one of the four cylinders #1 to #4 will be undergoing the expansion stroke. In a cylinder that is in the compression stroke or the expansion stroke, the intake valve 40 and the exhaust valve 42 will be closed. Thus, when the motor generator 12 starts the engine 10, the piston 50 inside the cylinder that is in the compression stroke or the expansion stroke will resist movement. In other words, a load will be applied to the motor generator 12. For example, if the motor generator 12 starts driving the engine 10 when the crank angle is 0 degrees, cylinder #1 and cylinder #3 will apply load to the motor generator 12. For example, if the motor generator 12 starts driving the engine 10 when the crank angle is about to reach 180 degrees, cylinder #3 and cylinder #4 will apply load to the motor generator 12 as the crank angle advances beyond 180 degrees.

When the motor generator 12 is able to overcome the load of the cylinder in the compression stroke and the load of the cylinder in the expansion stroke, the motor generator 12 will successfully start the engine 10.

First Starting Process and Second Starting Process

Figure 3:
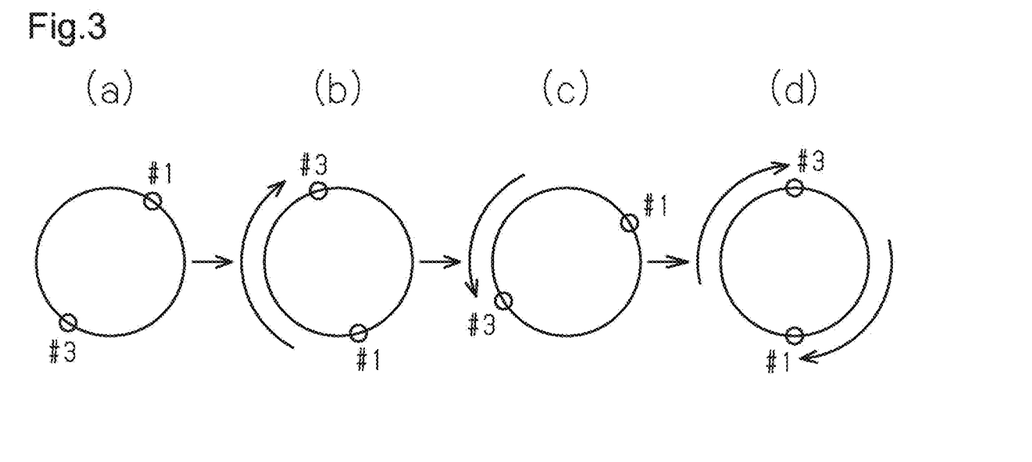
FIG. 3 is a schematic diagram showing movement of cylinders in a first starting process and a second starting process.

FIG. 3 shows a case in which the motor generator 12 successfully starts the engine 10 through a first starting process and a second starting process.

Part (a) of FIG. 3 shows a state in which the crank angle is 45 degrees. When the crank angle is 45 degrees, cylinder #1 is in the expansion stroke and cylinder #3 is in the compression stroke. The motor generator 12 starts driving the engine 10 in the state in which the crank angle is 45 degrees.

Part (b) of FIG. 3 shows a state in which the crank angle is 160 degrees. For example, the compressed air in cylinder #3 causes the engine rotation speed to become less than zero when the crank angle is 160 degrees. Since the engine rotation speed has become less than zero, the controller 34 suspends the supply of power from the high-voltage battery 26 to the motor generator 12.

As the controller 34 suspends the supply of power to the motor generator 12, the crankshaft starts rotating in the reverse direction. Eventually, as shown in part (c) of FIG. 3, the engine rotation speed becomes zero. Part (c) of FIG. 3 shows a state in which the crank angle is 75 degrees.

Then, the controller 34 starts driving the motor generator 12 by supplying power to the motor generator 12. As shown in part (d) of FIG. 3, the crank angle reaches 180 degrees. In this case, the motor generator 12 successfully starts the engine 10.

The process performed from when the motor generator 12 starts driving the engine 10 in the state in which the crank angle is 45 degrees to when the engine rotation speed becomes less than zero corresponds to the first starting process. The process performed after the engine rotation speed becomes less than zero corresponds to the second starting process. A case in which the engine 10 is successfully started by the first starting process and the second starting process will now be described with reference to FIG. 4.

Figure 4:
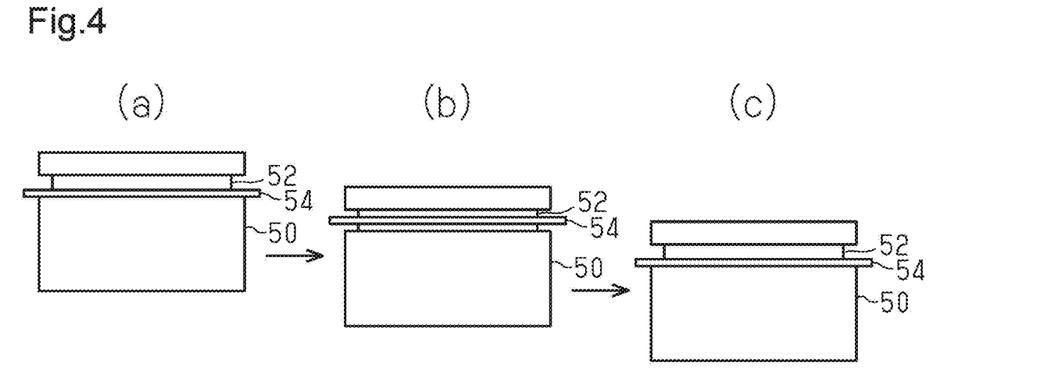
FIG. 4 is a diagram illustrating movement of a piston ring after the second starting process is initiated.

FIG. 4 shows the piston 50 in cylinder #3 during the compression stroke. The piston 50 includes an outer circumferential surface where a ring groove 52 is formed. A piston ring 54 is fitted to the ring groove 52.

The lower part of the piston ring 54 in the ring groove 52 is forced against the piston 50 during a period from when the motor generator 12 starts driving the engine 10 to when the engine rotation speed becomes zero. In this case, the driving force of the motor generator 12 drives the piston 50 toward the upper side in FIG. 4. Also, the pressure of the air in cylinder #3 is applied to the piston ring 54. Therefore, the force acting to press the piston ring 54 toward the lower side in FIG. 4 is applied to the piston ring 54. In this manner, the lower part of the piston ring 54 is forced against the piston 50. In particular, as shown in part (a) of FIG. 4, the lower part of the piston ring 54 is forced against the piston 50 when the engine rotation speed becomes zero.

When the repulsion force produced by the compressed air in cylinder #3 causes the engine rotation speed to become less than zero, the second starting process is initiated. This suspends the supply of power to the motor generator 12. When the supply of power to the motor generator 12 is suspended, the force that drives the piston 50 upward will no longer act on the piston 50. Thus, the repulsion force of the compressed air will press the piston 50 downward.

As shown in Part (b) of FIG. 4, if there is no force that drives the piston 50 upward and the piston 50 is pressed downward as described above, the lower part of the piston ring 54 will separate from the piston 50 immediately after the crankshaft starts rotating in the reverse direction. When the lower part of the piston ring 54 is separated from the piston 50, the compressed air flows out of the combustion chamber 38 through the gap between the inner circumferential surface of the piston ring 54 and the ring groove 52. Eventually, as shown in part (c) of FIG. 4, the lower part of the piston ring 54 will again be forced against the piston 50 such that the compressed air stops flowing out of the combustion chamber 38.

The amount of compressed air in cylinder #3 in the second starting process is decreased from that in the first starting process. Thus, the motor generator 12 is more likely to overcome the load of the cylinder that is undergoing the compression stroke and the cylinder that is undergoing the expansion stroke.

Motor Generator 12 Successfully Starting Engine 10 Through First Starting Process A case in which the motor generator 12 successfully starts the engine 10 through the first starting process will now be described with reference to FIG. 5. In the example shown in FIG. 5, the engine rotation speed becomes greater than or equal to an engine rotation speed threshold value within a first time threshold value, which will be described later. Thus, the first starting process accomplishes starting of the engine 10.

At time T10, the controller 34 determines that an execution condition for starting the engine 10 is satisfied. The execution condition for starting the engine 10 is set to, for example, a condition in which an ignition switch of the vehicle 100 is turned on. The controller 34 initiates the engine starting process at time T10. In the example shown in FIG. 5, the engine starting process includes only the first starting process. The first starting process includes a first pre-torque process and a first MG high-voltage applying process.

From time T10 to time T11, the controller 34 executes the first pre-torque process. The pre-torque process includes a process for pressing a tensioner (not shown) against the belt 16. In the first pre-torque process, the controller 34 controls and requests the motor generator 12 to produce a relatively small torque. The first pre-torque process sets the belt 16 in a desired tensioned state. This allows force to be transmitted from the motor generator pulley 12a to the crank pulley 10a by the belt 16.

At time T11, the controller 34 initiates the first MG high-voltage applying process. In the first MG high-voltage applying process, the controller 34 controls and requests the motor generator 12 to produce a relatively large torque. Specifically, the controller 34 drives the motor generator 12 by supplying the motor generator 12 with the power from the high-voltage battery 26 to crank the engine 10.

At time T12, the controller 34 determines that the engine rotation speed is greater than or equal to the engine rotation speed threshold value. The engine rotation speed threshold value is set to allow for determination of whether the motor generator 12 successfully started the engine 10. When the controller 34 determines that the engine rotation speed is greater than or equal to the engine rotation speed threshold value at time T12, the controller ends the first MG high-voltage applying process.

During the first starting process, the controller 34 monitors whether an elapsed time from time T10, which is when the first starting process was initiated, is less than or equal to the first time threshold value. The first time threshold value is the sum of a first pre-torque period A and a battery rated time BRT. The first pre-torque period A refers to the period from when the first pre-torque process begins to when the first pre-torque process ends. The battery rated time BRT refers to a rated time of the high-voltage battery 26. The rated time of the high-voltage battery 26 is set as a time limit for safely using the high-voltage battery 26 at a high voltage. Using the high-voltage battery 26 at a high voltage means supplying the motor generator 12 with the power from the high-voltage battery 26 to crank the engine 10.

Figure 5:
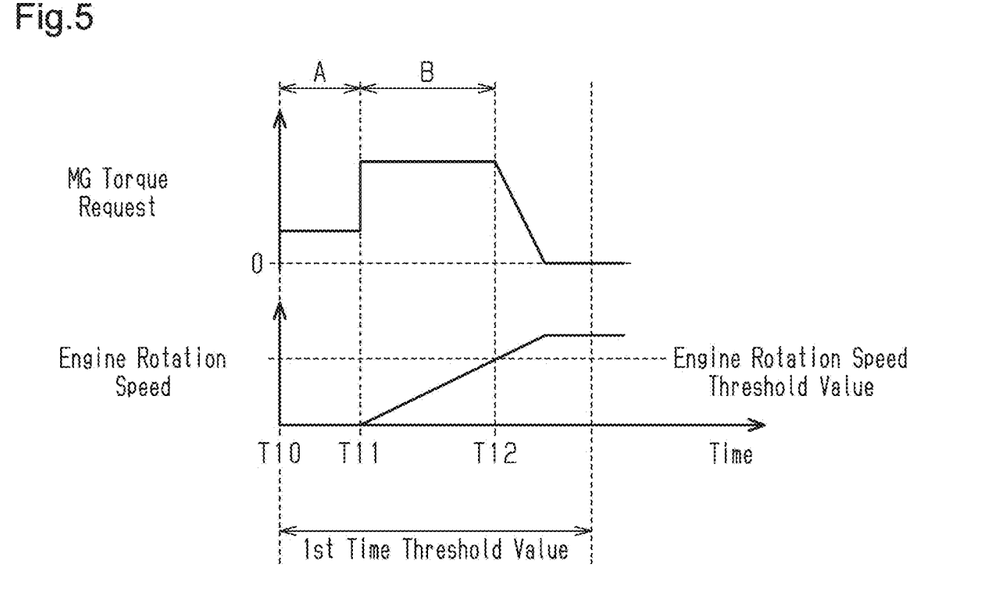
FIG. 5 is a time diagram when a motor generator successfully starts an engine in the first starting process.

In the example shown in FIG. 5, the sum of the first pre-torque period A and a first MG high-voltage applying period B is less than the first time threshold value. The first MG high-voltage applying period B refers to the period from when the first MG high-voltage applying process begins to when the first MG high-voltage applying process ends. The sum of the first pre-torque period A and the first MG high-voltage applying period B is less than the first time threshold value. Thus, the high-voltage battery 26 can be used safely.

Figure 6:
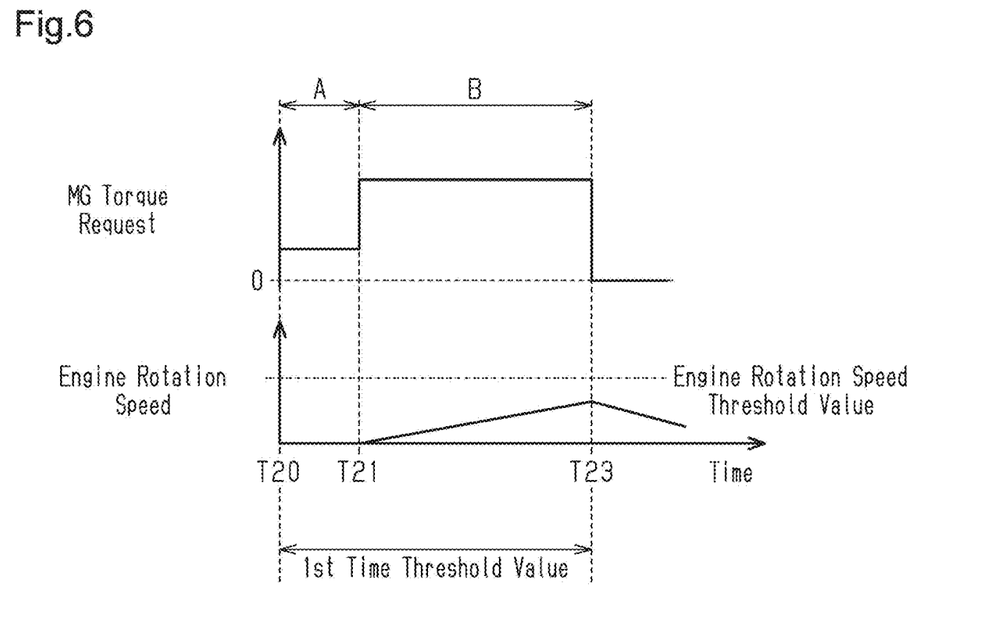
FIG. 6 is a time diagram when the motor generator fails to start the engine as time runs out during the first starting process.

Motor Generator 12 Failing to Start Engine 10 as Time Runs Out During First Starting Process A case in which the motor generator 12 fails to start the engine 10 as time runs out during the first starting process will now be described with reference to FIG. 6. In this case, during the first starting process, the elapsed time from when the first starting process was initiated becomes greater than the first time threshold value and the engine rotation speed remains less than the engine rotation speed threshold value. Thus, the controller 34 determines that the motor generator 12 failed to start the engine 10.

At time T20, the controller 34 determines that the execution condition for starting the engine 10 is satisfied. The controller 34 initiates the engine starting process at time T20. In the example shown in FIG. 6, the engine starting process includes only the first starting process.

From time T20 to time T21, the controller 34 executes the first pre-torque process. The first pre-torque process is described above.

At time T21, the controller 34 initiates the first MG high-voltage applying process. The first MG high-voltage applying process is described above.

At time T23, the controller 34 determines that the engine rotation speed is less than the engine rotation speed threshold value and the elapsed time is greater than the first time threshold value. Thus, the controller 34 determines that the motor generator 12 failed to start the engine 10. The controller 34 ends the first MG high-voltage applying process. Then, the controller 34 starts the engine 10 with the starter 20.

Motor Generator 12 Successfully Starting Engine 10 Through Second Starting Process A case in which the motor generator 12 successfully starts the engine 10 through the second starting process will now be described with reference to FIG. 7. In the example shown in FIG. 7, the engine rotation speed becomes greater than or equal to the engine rotation speed threshold value within a second time threshold value during the second starting process. Thus, the second starting process accomplishes starting of the engine 10.

At time T30, the controller 34 determines that the execution condition for starting the engine 10 is satisfied. The controller 34 initiates the engine starting process at time T30.

From time T30 to time T31, the controller 34 executes the first pre-torque process. The first pre-torque process is described above.

At time T31, the controller 34 initiates the first MG high-voltage applying process. The first MG high-voltage applying process is described above. At time T32, the controller 34 determines that the engine rotation speed is less than zero. This means that the compressed air in the cylinder caused the engine rotation speed to become less than zero.

When the engine speed is less than zero, the controller 34 ends the first starting process and initiates the second starting process. In other words, the second starting process is executed under the condition that the engine rotation speed became less than zero during the first starting process. The second starting process includes, as described later, a torque releasing process, a second pre-torque process, and a second MG high-voltage applying process.

From time T32 to time T33, the controller 34 executes the torque releasing process. The torque releasing process suspends the supply of power from the high-voltage battery 26 to the motor generator 12. A torque releasing period C is set so that the torque releasing period C ends simultaneously with when the engine rotation speed switches from less than zero to greater than or equal to zero. The torque releasing period C refers to the period from when the torque releasing process begins to when the torque releasing process ends. In other words, the torque releasing period C corresponds to a suspension period during which the supply of power from the high-voltage battery 26 to the motor generator 12 is suspended in the second starting process.

The torque releasing period C is variably set. A method for variably setting the torque releasing period C will now be described. The motor generator 12 and the engine 10 are connected to each other by the belt 16. Immediately after time T32, the engine rotation speed is negative. Thus, an MG rotation speed, which is the rotation speed of the motor generator 12, is negative immediately after time T32. The controller 34 predicts when the torque releasing period C will end when the MG rotation speed that is negative is greater than a negative threshold value and increasing. Specifically, the controller 34 predicts when the torque releasing period C will end if the reverse rotation of the motor generator 12 gradually slows down and the rotation speed of the motor generator 12 becomes lower than a threshold value. In this manner, the controller 34 sets the torque releasing period C so that the torque releasing period C ends simultaneously with when the engine rotation speed switches from less than zero to greater than or equal to zero.

From time T33 to time T34, the controller 34 executes the second pre-torque process. The second pre-torque process is the same as the first pre-torque process.

From time T34, the controller 34 initiates the second MG high-voltage applying process. The second MG high-voltage applying process is the same as the first MG high-voltage applying process. That is, the second MG high-voltage applying process drives the motor generator 12 by supplying the motor generator 12 with the power from the high-voltage battery 26 to crank the engine 10.

At time T35, the controller 34 determines that the engine rotation speed is greater than or equal to the engine rotation speed threshold value. When the controller 34 determines that the engine rotation speed is greater than or equal to the engine rotation speed threshold value at time T35, the controller 34 ends the second MG high-voltage applying process.

During the second starting process, the controller 34 monitors whether the elapsed time from time T30, which is when the second starting process was initiated, is less than equal to the second time threshold value. The second time threshold value is the sum of the first pre-torque period A, the torque releasing period C, a second pre-torque period D, and the battery rated time BRT. The second pre-torque period D refers to the period from when the second pre-torque process begins to when the second pre-torque process ends. The second time threshold value is greater than the first time threshold value by an amount corresponding to the torque releasing period C and the second pre-torque period D.

Figure 7:
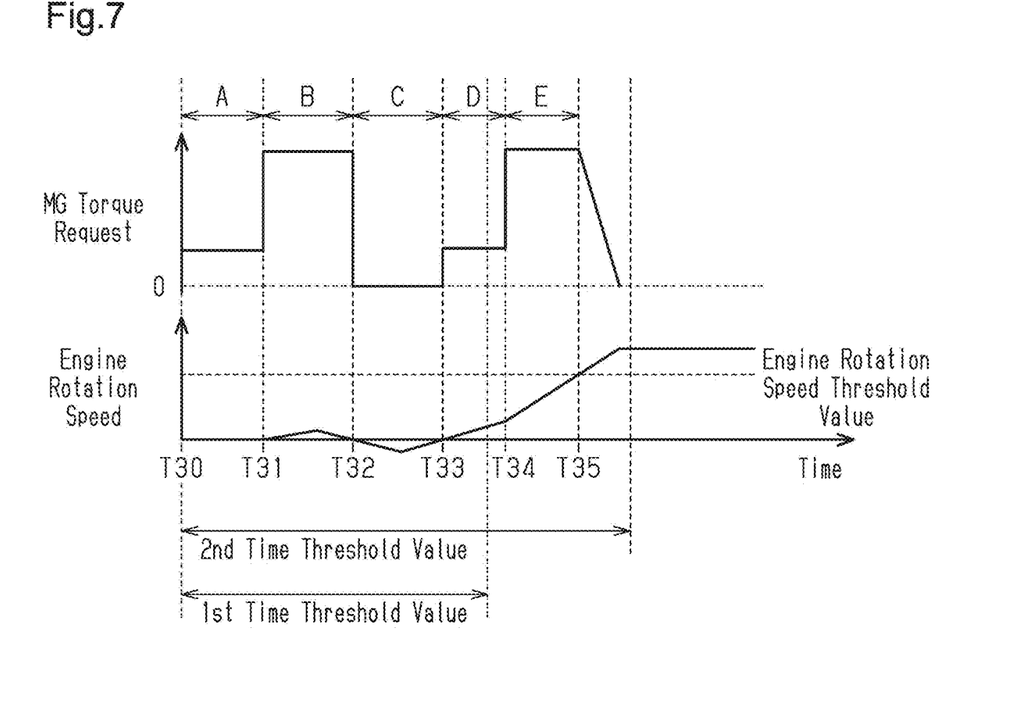
FIG. 7 is a time diagram when the motor generator successfully starts the engine in the second starting process.

In the example shown in FIG. 7, the sum of the first pre-torque period A, the first MG high-voltage application period B, the torque releasing period C, the second pre-torque period D, and a second MG high-voltage application period E is less than the second time threshold value. Thus, the high-voltage battery 26 can be used safely. The second MG high-voltage applying period E refers to the period from when the second MG high-voltage applying process begins to when the second MG high-voltage applying process ends.

Figure 8:
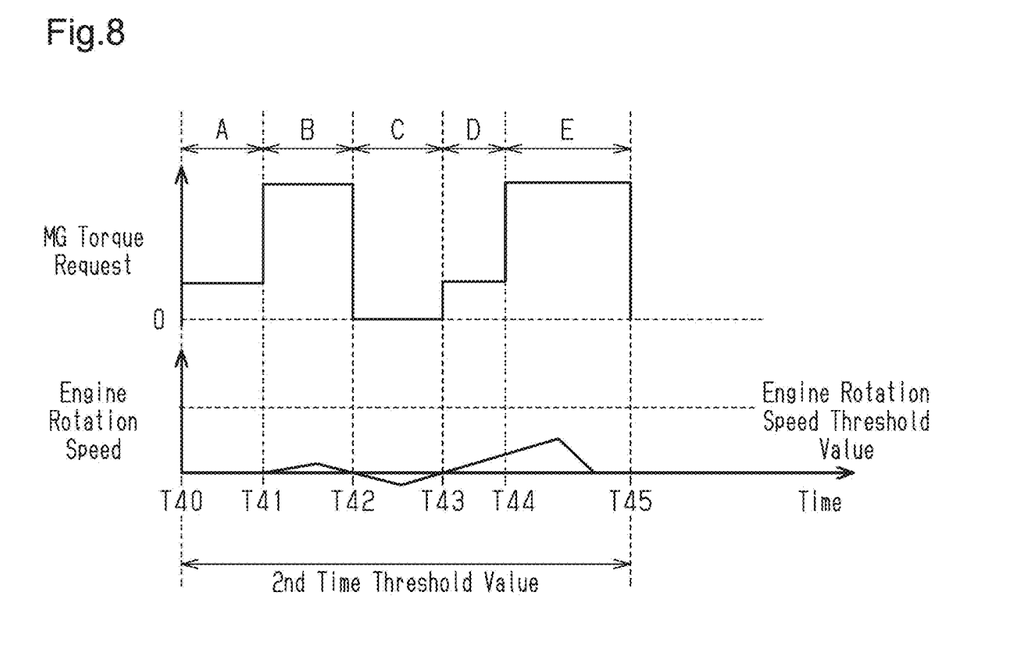
FIG. 8 is a time diagram when the motor generator fails to start the engine as time runs out during the second starting process.

Motor Generator 12 Failing to Start Engine 10 as Time Runs Out During Second Starting Process A case in which the motor generator 12 fails to start the engine 10 as time runs out during the second starting process will now be described with reference to FIG. 8. In the example shown in FIG. 8, during the second starting process, the elapsed time from when the second starting process was initiated is greater than the second time threshold value and the engine rotation speed remains less than the engine rotation speed threshold value. Thus, the controller 34 determines that the motor generator 12 failed to start the engine 10.

At time T40, the controller 34 determines that the execution condition for starting the engine 10 is satisfied. The controller 34 initiates the engine starting process at time T40. From time T40 to time T41, the controller 34 executes the first pre-torque process.

At time T41, the controller 34 initiates the first MG high-voltage applying process. At time T42, the controller 34 determines that the engine rotation speed is less than zero. Since the engine speed is less than zero, the controller 34 ends the first starting process and initiates the second starting process.

From time T42 to time T43, the controller 34 executes the torque releasing process. From time T43 to time T44, the controller 34 executes the second pre-torque process.

At time T44, the controller 34 initiates the second MG high-voltage applying process. At time T45, the controller 34 determines that the engine rotation speed is less than the engine rotation speed threshold value and the elapsed time is greater than the second time threshold value. Thus, the controller 34 determines that the motor generator 12 failed to start the engine 10. The controller 34 ends the second MG high-voltage applying process. Then, the controller 34 starts the engine 10 with the starter 20.

Flowchart of Process Executed by Controller 34

A process executed by the controller 34 will now be described with reference to FIGS. 9 and 10. The actions illustrated in FIGS. 5 and 6 correspond to the flowchart shown in FIG. 9. The actions illustrated in FIGS. 7 and 8 correspond to the flowcharts shown in FIGS. 9 and 10. When the execution condition for starting the engine 10 is satisfied, the controller 34 starts the process shown in FIG. 9. The engine starting process includes the first starting process. The first starting process includes the series of processes performed from the beginning of the first pre-torque process shown in FIG. 9 to the end of the first MG high-voltage applying process shown in FIG. 9. Further, the engine starting process includes the second starting process executed when a shifting condition is satisfied in the first starting process (step S906: YES). The shifting condition is a logical disjunction condition in which the engine rotation speed becomes less than zero or the engine rotation speed is maintained at zero for a predetermined period or longer. The second starting process includes the series of processes performed from the beginning of the torque releasing process shown in FIG. 10 to the end of the second MG high-voltage applying process shown in FIG. 10.

Figure 9:
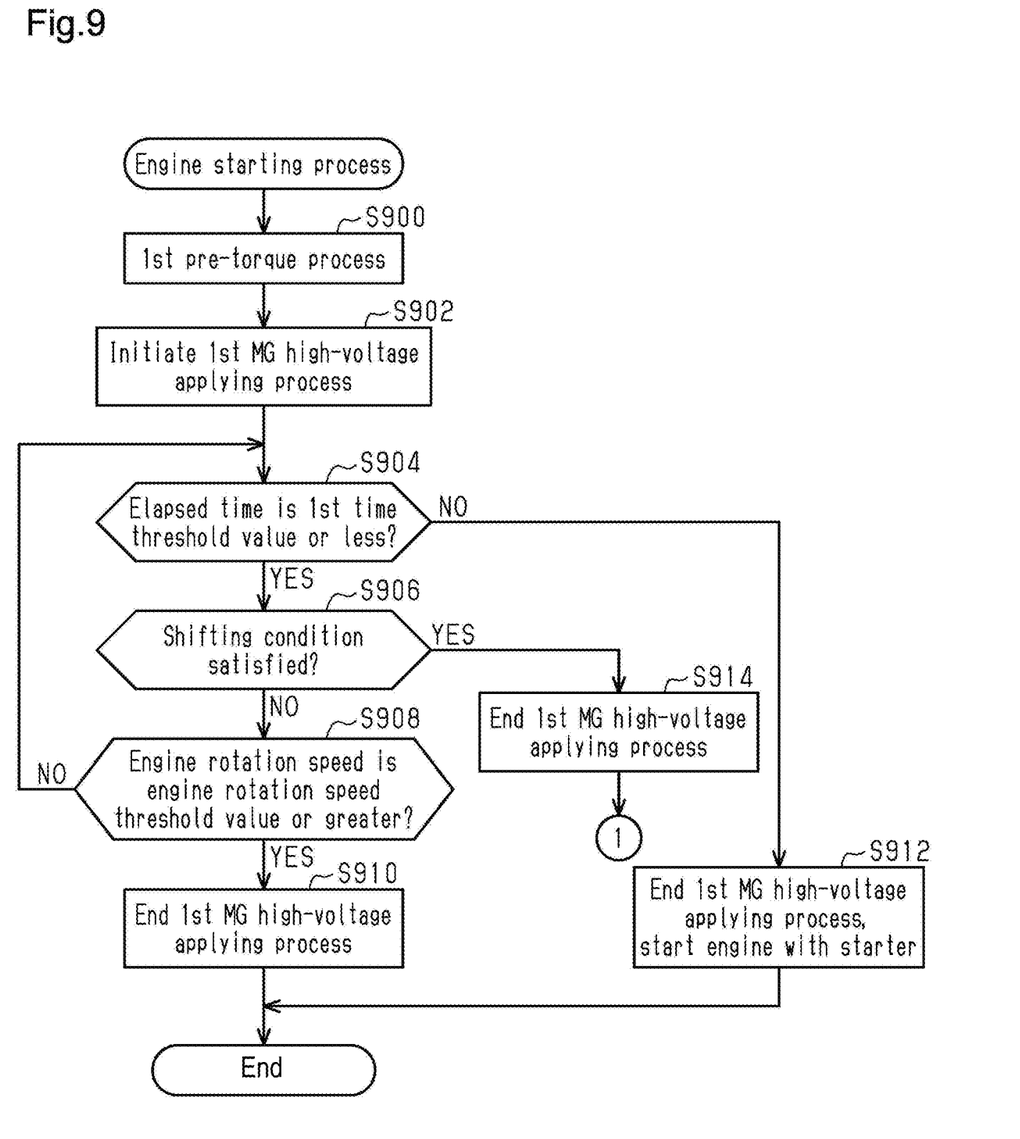
FIG. 9 is a flowchart illustrating a process executed by the controller shown in FIG. 1.

As shown in FIG. 9, in step S900, the controller 34 executes the first pre-torque process. In step S902, the controller 34 initiates the first MG high-voltage applying process.

In step S904, the controller 34 determines whether the elapsed time from when the first starting process was initiated is less than or equal to the first time threshold value. When an affirmative determination is given in step S904 (step S904: YES), the controller 34 proceeds to step S906. In step S906, the controller 34 determines whether the shifting condition is satisfied. When a negative determination is given in step S906 (step S906: NO), the controller 34 proceeds to step S908. In step S908, the controller 34 determines whether the engine rotation speed is greater than or equal to the engine rotation speed threshold value. When a negative determination is given in step S908 (step S908: NO), the controller 34 returns to step S904. Steps S904, S906, and S908 are repeated as long as the obtained determination is affirmative in step S904, negative in S906, and negative in step S908.

When an affirmative determination is given in step S908 (step S908: YES), the controller 34 proceeds to step S910. In step S910, the controller 34 ends the first MG high-voltage applying process. Then, the controller 34 end processing. A case in which the controller 34 proceeds to step S910 and then ends processing corresponds to the example shown in FIG. 5.

When a negative determination is given in step S904 (step S904: NO), the controller 34 proceeds to step S912. In step S912, the controller 34 ends the first MG high-voltage applying process and starts the engine 10 with the starter 20. Then, the controller 34 ends processing. A case in which the controller 34 proceeds to step S912 and then ends processing corresponds to the example shown in FIG. 6.

When an affirmative determination is given in step S906 (step S906: YES), the controller 34 proceeds to step S914. In step S914, the controller 34 ends the first MG high-voltage applying process. That is, the controller 34 ends the first starting process. Then, the controller 34 initiates the second starting process shown in FIG. 10.

Figure 10:
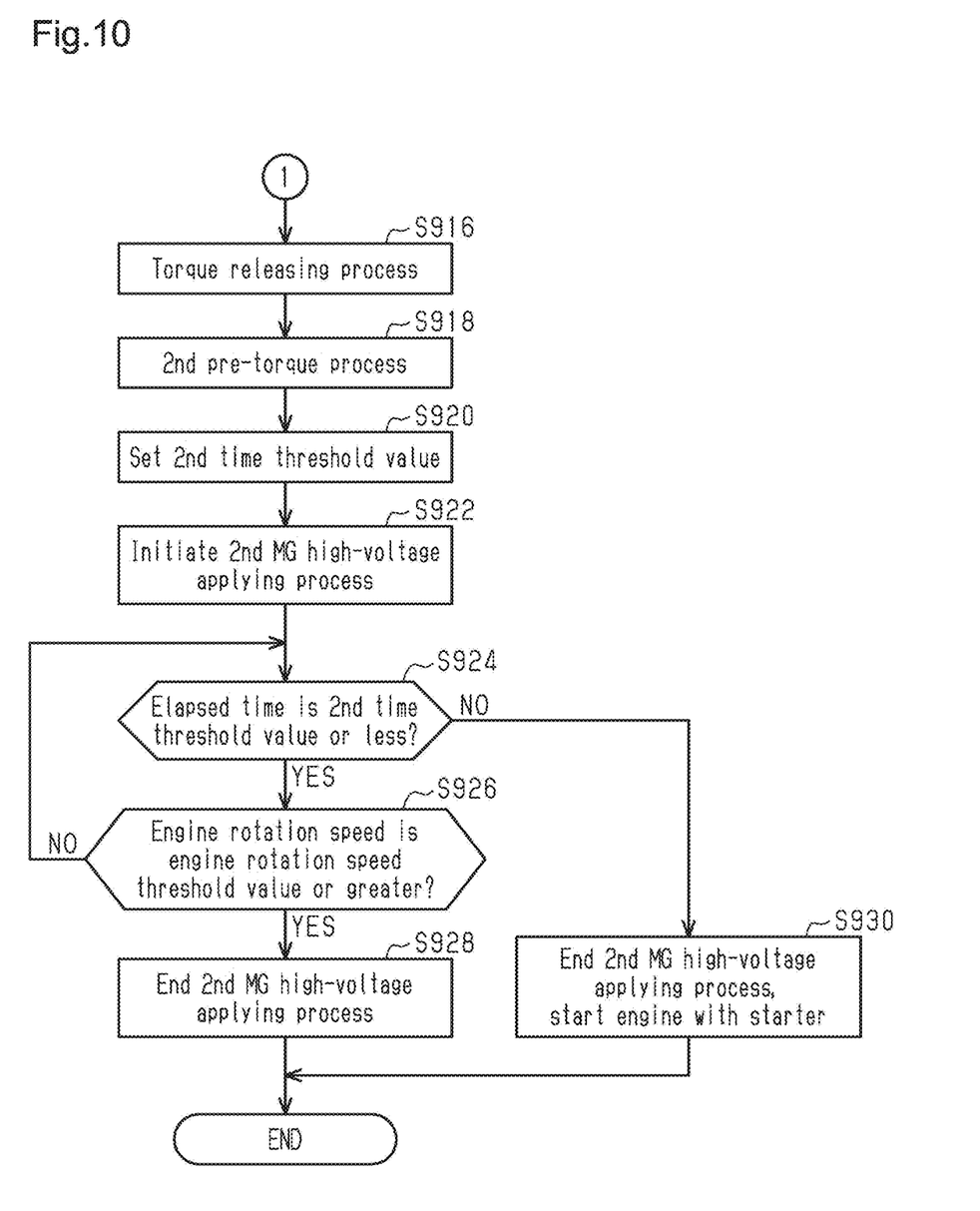
FIG. 10 is a flowchart illustrating a process executed by the controller shown in FIG. 1.

As shown in FIG. 10, in step S916, the controller 34 executes the torque releasing process. In step S918, the controller 34 executes the second pre-torque process. In step S920, the controller 34 sets the second time threshold value. As described above, the second time threshold value is the sum of the first pre-torque period A, the torque releasing period C, the second pre-torque period D, and the battery rated time BRT. As described above, the torque releasing period C is variably set.

In step S922, the controller 34 initiates the second MG high-voltage applying process. Then, the controller 34 proceeds to step S924.

In step S924, the controller 34 determines whether the elapsed time from when the first starting process was initiated is less than or equal to the second time threshold value.

When an affirmative determination is given in step S924 (step S924: YES), the controller 34 proceeds to step S926. In step S926, the controller 34 determines whether the engine rotation speed is greater than or equal to the engine rotation speed threshold value. When a negative determination is given in step S926 (step S926: NO), the controller 34 returns to step S924. Steps S924 and S926 are repeated as long as the obtained determination is affirmative in step S924 and negative in step S926.

When an affirmative determination is given in step S926 (step S926: YES), the controller 34 proceeds to step S928. In step S928, the controller 34 ends the second MG high-voltage applying process. Then, the controller 34 end processing. A case in which the controller 34 proceeds to step S928 and then ends processing corresponds to the example shown in FIG. 7.

When a negative determination is given in step S924 (step S924: NO), the controller 34 proceeds to step S930. In step S930, the controller 34 ends the second MG high-voltage applying process and starts the engine 10 with the starter 20. Then, the controller 34 end processing. A case in which the controller 34 proceeds to step S930 and then ends processing corresponds to the example shown in FIG. 8.

Operation and Advantage of Present Embodiment (1) The controller 34 may successfully start the engine 10 through the first starting process without performing the second starting process. Further, the controller 34 may successfully start the engine 10 by performing both the first starting process and the second starting process. In the above configuration, the controller 34 ends the first starting process and initiates the second starting process when the shifting condition is satisfied. The shifting condition is a logical disjunction condition in which the engine rotation speed becomes less than zero or the engine rotation speed is maintained at zero for a predetermined period or longer. This is because the engine 10 cannot be started by continuing the first starting process when the engine rotation speed becomes less than zero or when the engine rotation speed is maintained at zero for a predetermined period or longer during the first starting process. The above configuration starts the engine 10 with the motor generator 12 more often than a configuration in which the second starting process is not executed.

The reason the engine 10 is successfully started by ending the first starting process and executing the second starting process will now be described. The engine 10 includes the cylindrical pistons 50 and each piston 50 has the piston ring 54 fitted to the ring groove 52 in the outer circumference. When one cylinder is undergoing the compression stroke and another cylinder is undergoing the expansion stroke, a large load is applied to the motor generator 12. In the cylinder undergoing the compression stroke, the piston ring 54 is pressed against the lower end wall of the ring groove 52 during the first starting process. When the first starting process ends and the second starting process starts, the supply of power to the motor generator 12 is suspended. This lowers the piston 50 in the cylinder that is undergoing the compression stroke. As the piston 50 falls, the piston ring 54 momentarily separates from the lower end wall of the ring groove 52, thereby forming an air passage in the ring groove 52. The compressed air escapes from the cylinder through the air passage. Accordingly, in the second starting process, repulsion force produced by the air in the cylinder undergoing the compression stroke is decreased from that in the first starting process. Therefore, the engine 10 may be successfully started by ending the first starting process and executing the second starting process.

As shown in FIG. 7, the time threshold value compared with the elapsed time from when the first starting process was initiated differs between the first starting process and the second starting process. Specifically, the second time threshold value is set to be greater than the first time threshold value. The second time threshold value is set to be greater than the first time threshold value for the following reason. If the high-voltage battery 26 supplies a high voltage such as that used for cranking by the motor generator 12 over a long period of time, the high-voltage battery 26 may be damaged. The first time threshold value and the second time threshold value are set to avoid such damage to the high-voltage battery 26. The second starting process includes a period during which the supply of power from the high-voltage battery 26 to the motor generator 12 is suspended. Thus, the second time threshold value is set to be greater than the first time threshold value.

In a comparative example, the controller 34 determines whether the motor generator 12 successfully started the engine 10 when a fixed time period elapses and does not take into consideration the period during which the supply of power from the high-voltage battery 26 to the motor generator 12 is suspended. In the comparative example, the controller 34 may determine that the motor generator 12 failed to start the engine 10 even though the second starting process could have successfully started the engine 10 without damaging the high-voltage battery 26.

In the above configuration, the second time threshold value is set to be greater than the first time threshold value. This starts the engine 10 with the motor generator 12 more often than the comparative example.

(2) When the second starting process is initiated, one cylinder will be undergoing the compression stroke, and another cylinder will be undergoing the expansion stroke. The second starting process is executed when the shifting condition is satisfied. The shifting condition is a logical disjunction condition in which the engine rotation speed becomes less than zero in the first starting process or the engine rotation speed is maintained at zero for a predetermined period or longer in the first starting process. If the second starting process is executed when the engine rotation speed becomes less than zero in the first starting process, the engine rotation speed is negative at the beginning of the torque releasing period C. If the second starting process is executed when the engine rotation speed is maintained at zero for a predetermined period or longer, the repulsion force of air causes the engine rotation speed to become negative immediately after the torque releasing period C begins. Thus, during the torque releasing period C, the air in the cylinder that is undergoing the compression stroke will be expanded and the air in the cylinder that is undergoing the expansion stroke will be compressed. Eventually, the compressed air in the cylinder undergoing the expansion stroke presses the piston 50 downward so that the engine rotation speed becomes zero.

In the above configuration, the torque releasing period C is set to end when the engine rotation speed switches from less than zero to greater than or equal to zero. After the torque releasing period C ends, the controller 34 drives the motor generator 12 by supplying the motor generator 12 with power from the high-voltage battery 26 to crank the engine 10. The compressed air presses the piston 50 downward in the cylinder undergoing the expansion stroke immediately after the engine rotation speed switches from less than zero to greater than or equal to zero. In other words, the compressed air assists rotation of the engine 10 in the positive direction. This cranks the engine 10 more effectively as compared with a configuration that cranks the engine 10 when the engine rotation speed is negative.

(3) In a comparative example, the controller 34 may determine the end of the torque releasing period C based on when the rotation speed of the motor generator 12 becomes zero. In this configuration, it is difficult to set the torque releasing period C to end when the engine rotation speed switches from less than zero to greater than or equal to zero. In the above configuration, the controller 34 predicts the end of the torque releasing period C based on when the negative rotation speed of the motor generator 12 becomes greater than a negative threshold value before becoming zero. This readily sets the torque releasing period C to end when the engine rotation speed switches from less than zero to greater than or equal to zero.

Modified Examples

The present embodiment may be modified as follows. The present embodiment and the following modifications can be combined as long as the combined modifications remain technically consistent with each other.

The configuration of the vehicle 100 may be changed. In the above embodiment, the number of the cylinders is four. However, this is merely an example. The number of the cylinders may be changed and may be, for example, six.

The above embodiment is not provided with a clutch that connects and disconnects the engine 10 and the crank pulley 10*a*. However, a clutch may be arranged between the engine 10 and the crank pulley 10*a*.

In the above embodiment, the vehicle 100 is provided with the high-voltage battery 26 and the low-voltage battery 28. However, this is merely an example. The vehicle 100 may only include a battery that supplies power to the motor generator 12.

The combustion cycle may be changed. In the above embodiment, air-fuel mixture is ignited in cylinder #1, cylinder #3, cylinder #4, and cylinder #2 in this order. Air-fuel mixture may be ignited in the order of cylinder #1, cylinder #2, cylinder #4, and cylinder #3.

In the above embodiment, the shifting condition is a logical disjunction condition in which the engine rotation speed is less than zero or the engine rotation speed is maintained at zero for a predetermined period or longer. Alternatively, the shifting condition may be a condition in which the engine rotation speed is less than zero. In other words, determination of whether the engine rotation speed is maintained at zero for a predetermined period or longer may be omitted.

In the above embodiment, the first time threshold value is the sum of the first pre-torque period A and the battery rated time BRT. The second time threshold value is the sum of the first pre-torque period A, the torque releasing period C, the second pre-torque period D, and the battery rated time BRT.

However, this is merely an example. The first time threshold value and the second time threshold value may be any values as long as the second time threshold value is greater than the first time threshold value and damage to the battery that supplies power to the motor generator 12 can be avoided.

In the above embodiment, the torque releasing period C is variably set. The torque releasing period C may be a fixed value.

In the above embodiment, the controller 34 predicts the end of the torque releasing period C based on when the MG rotation speed that is negative is greater than a negative threshold value and increasing. However, this is merely an example. For example, the controller 34 may determine the end of the torque releasing period C based on when the angle of the crankshaft rotated in the reverse direction becomes greater than a threshold value. The controller 34 may determine the end of the torque releasing period C based on when an elapsed time from a time point at which the crankshaft started to rotate in the reverse direction becomes greater than a threshold value.

In the above embodiment, the controller 34 includes a central processing unit (CPU), a read-only memory (ROM), and a random-access memory (RAM) and executes software processing. However, this is merely an example. For example, the controller 34 may include a dedicated hardware circuit (e.g., application specific integrated circuit (ASIC)) that executes at least part of the software processing performed in the above embodiment. Specifically, the controller 34 may only have any of the following configurations (a) to (c). (a) The controller 34 includes a processor that executes all processes according to a program and a program storage device such as a ROM that stores the program. In other words, the controller 34 includes a software execution device. (b) The controller 34 includes a processor that executes part of processes according to a program and a program storage. The controller 34 further includes a dedicated hardware circuit that executes the remaining processes. (c) The controller 34 includes a dedicated hardware circuit that executes all processes. There may be more than one software execution device and/or more than one dedicated hardware circuit. Specifically, the above-described processes may be executed by the processing circuitry including at least one of a software execution device and a dedicated hardware circuit. The processing circuitry may include more than one software execution device and more than one dedicated hardware circuit. A program storage device, or computer readable medium, includes any type of medium that is accessible by a versatile computer and a dedicated computer.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid electric vehicle including an engine, a motor generator, a belt connecting the engine and the motor generator, a battery configured to supply the motor generator with power, and a starter configured to start the engine, the controller comprising:

processing circuitry configured to execute an engine starting process when an execution condition for starting the engine is satisfied, wherein:

the engine starting process includes a first starting process that drives the motor generator by supplying the motor generator with power from the battery to crank the engine, and a second starting process executed in response to a shifting condition being satisfied, the shifting condition being a logical disjunction condition in which an engine rotation speed, which is a rotation speed of the engine, becomes less than zero in the first starting process or the engine rotation speed is maintained at zero for a predetermined period or longer in the first starting process;

the second starting process includes suspending the supply of power from the battery to the motor generator during a suspension period and then driving the motor generator by supplying the motor generator with power from the battery to crank the engine;

in response to an elapsed time from when the first starting process is initiated becoming greater than a first threshold value and the engine rotation speed remaining less than an engine rotation speed threshold value during the first starting process, the processing circuitry is configured to determine that the motor generator failed to start the engine;

in response to the elapsed time becoming greater than a second threshold value and the engine rotation speed remaining less than the engine rotation speed threshold value during the second starting process, the processing circuitry is configured to determine that the motor generator failed to start the engine, the second threshold value being greater than the first threshold value;

in response to determining that the motor generator failed to start the engine, the processing circuitry is configured to start the engine with the starter; and the suspension period, during which the supply of power from the battery to the motor generator is suspended in the second starting process, ends simultaneously with a timing at which the engine rotation speed switches from being less than zero to being greater than or equal to zero.

2. The controller according to claim 1, wherein the processing circuitry is configured to predict an end of the suspension period in response to a rotation speed of the motor generator that is negative being greater than a negative threshold value and increasing.

3. A controller for a hybrid electric vehicle including an engine, a motor generator, a belt connecting the engine and the motor generator, a battery configured to supply the motor generator with power, and a starter configured to start the engine, the controller comprising:

processing circuitry configured to execute an engine starting process when an execution condition for starting the engine is satisfied, wherein:

the engine starting process includes a first starting process that drives the motor generator by supplying the motor generator with power from the battery to crank the engine, and a second starting process executed under a condition in which an engine rotation speed, which is a rotation speed of the engine, becomes less than zero in the first starting process;

the second starting process includes suspending the supply of power from the battery to the motor generator during a suspension period and then driving the motor generator by supplying the motor generator with power from the battery to crank the engine;

in response to an elapsed time from when the first starting process is initiated becoming greater than a first threshold value and the engine rotation speed remaining less than an engine rotation speed threshold value during the first starting process, the processing circuitry is configured to determine that the motor generator failed to start the engine;

in response to the elapsed time becoming greater than a second threshold value and the engine rotation speed remaining less than the engine rotation speed threshold value during the second starting process, the processing circuitry is configured to determine that the motor generator failed to start the engine, the second threshold value being greater than the first threshold value;

in response to determining that the motor generator failed to start the engine, the processing circuitry is configured to start the engine with the starter; and the suspension period, during which the supply of power from the battery to the motor generator is suspended in the second starting process, ends simultaneously with a timing at which the engine rotation speed switches from being less than zero to being greater than or equal to zero.

4. A method for controlling a hybrid electric vehicle including an engine, a motor generator, a belt connecting the engine and the motor generator, a battery configured to supply the motor generator with power, and a starter configured to start the engine, the method comprising:

executing an engine starting process when an execution condition for starting the engine is satisfied, wherein the engine starting process includes:

a first starting process that drives the motor generator by supplying the motor generator with power from the battery to crank the engine; and a second starting process executed in response to an engine rotation speed, which is a rotation speed of the engine, becoming less than zero in the first starting process or in response to the engine rotation speed being maintained at zero for a predetermined period or longer in the first starting process, the second starting process including suspending the supply of power from the battery to the motor generator during a suspension period and then driving the motor generator by supplying the motor generator with power from the battery to crank the engine;

in response to an elapsed time from when the first starting process is initiated becoming greater than a first threshold value and the engine rotation speed remaining less than an engine rotation speed threshold value, determining that the motor generator failed to start the engine during the first starting process;

in response to the elapsed time becoming greater than a second threshold value and the engine rotation speed remaining less than the engine rotation speed threshold value, determining that the motor generator failed to start the engine during the second starting process, the second threshold value being greater than the first threshold value;

in response to determining that the motor generator failed to start the engine, starting the engine with the starter; and the suspension period, during which the supply of power from the battery to the motor generator is suspended in the second starting process, ends simultaneously with a timing at which the engine rotation speed switches from being less than zero to being greater than or equal to zero.

5. The controller according to claim 1, wherein the processing circuitry is configured to, in the second starting process, drive the motor generator by supplying the motor generator with power from the battery to crank the engine immediately after the suspension period ends.

6. The controller according to claim 5, wherein the processing circuitry is configured to, in response to determining the elapsed time being less than or equal to the first threshold value, determine whether the shifting condition is satisfied.

7. The controller according to claim 6, wherein the processing circuitry is configured to, in response to the shifting condition being satisfied, end the first starting process and then initiate the second starting process.

8. The controller according to claim 7, wherein the first time threshold value is a sum of
 a first pre-torque period during which the processing circuitry is configured to request the motor generator to produce a first torque, and
 a predetermined rated time of the battery.

9. The controller according to claim 8, wherein the second threshold value is a sum of
 the first pre-torque period,
 the suspension period,
 a second pre-torque period during which the processing circuitry is configured to request the motor generator to produce a second torque same as the first torque, and
 the predetermined rated time of the battery.

* * * * *